US005925746A

United States Patent
Lauk et al.

[11] Patent Number: 5,925,746
[45] Date of Patent: Jul. 20, 1999

[54] AZO DYES, PROCESSES FOR THEIR PREPARATION AND THE USE THEREOF

[75] Inventors: Urs Lauk, Zürich, Switzerland; Patric Nowack, Lörrach, Germany

[73] Assignee: Ciba Specialty Chemicals Corporation, Tarrytown, N.Y.

[21] Appl. No.: 09/100,004

[22] Filed: Jun. 17, 1998

[30] Foreign Application Priority Data

Jul. 2, 1997 [CH] Switzerland .............................. 1606/97

[51] Int. Cl.⁶ .............................. C09B 62/09; D06P 1/38
[52] U.S. Cl. .......................... 534/634; 534/612; 534/797; 534/637
[58] Field of Search ................................... 534/612, 634, 534/797

[56] References Cited

U.S. PATENT DOCUMENTS

| | | | |
|---|---|---|---|
| 4,323,497 | 4/1982 | Hoyer et al. | 534/634 X |
| 4,693,726 | 9/1987 | Meininger et al. | 8/547 |
| 5,262,527 | 11/1993 | Gregory et al. | 534/797 |
| 5,328,995 | 7/1994 | Schaulin et al. | 534/797 |
| 5,451,251 | 9/1995 | Marfume et al. | 106/31.48 |
| 5,631,352 | 5/1997 | Lauk | 534/797 |
| 5,684,138 | 11/1997 | Klier et al. | 534/612 |
| 5,750,662 | 5/1998 | Reichert et al. | 534/634 X |

FOREIGN PATENT DOCUMENTS

| | | |
|---|---|---|
| 7-090212 | 4/1995 | Japan . |
| 8-113745 | 5/1996 | Japan . |
| 854432 | 11/1960 | United Kingdom . |
| 1260582 | 1/1972 | United Kingdom . |
| 1405016 | 9/1975 | United Kingdom . |

OTHER PUBLICATIONS

Kraska et al., Chemical Abstracts, 92:112243 (1980).
K. Venkataraman, *The Chemistry of Synthetic Dyes*, vol. VI, pp. 1–209, (1972).

*Primary Examiner*—Fiona T. Powers
*Attorney, Agent, or Firm*—Jacob M. Levine; Kevin T. Mansfield

[57] ABSTRACT

Azo dyes of the formula (1)

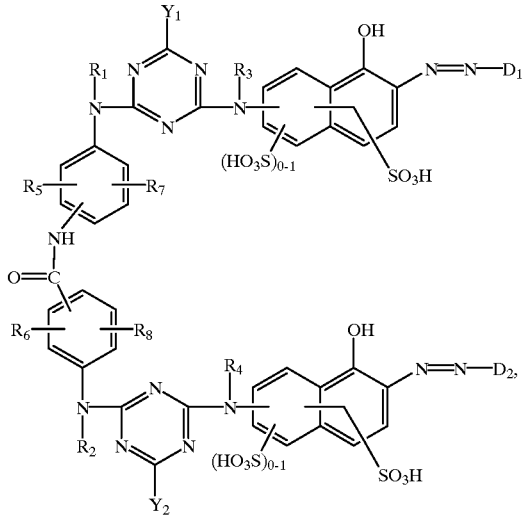

wherein $R_1$, $R_2$, $R_3$ and $R_4$ independently of one another are each hydrogen or substituted or unsubstituted $C_1$–$C_4$alkyl, $R_5$, $R_6$, $R_7$ and $R_8$ independently of one another are each hydrogen, $C_1$–$C_4$alkyl, $C_1$–$C_4$alkoxy, halogen or sulfo, $D_1$ and $D_2$ independently of one another are each a radical of the benzene or naphthalene series, and $Y_1$ and $Y_2$ independently of one another are each halogen, substituted or unsubstituted amino, morpholino or piperidin-1-yl or are piperazin-1-yl which is unsubstituted or substituted on the nitrogen, with the proviso that $D_1$ and $D_2$ are not both sulfophenyl if $Y_1$ and $Y_2$ are chlorine and $R_5$, $R_6$, $R_7$ and $R_8$ are hydrogen, are dyes for various substrates, especially cellulosic fibre materials.

They are stable to high temperatures and are therefore particularly suitable for the one-bath, single-stage dyeing of polyester/cotton blend fabrics with a disperse dye of the polyester fibres under the dyeing conditions for polyester fibres.

14 Claims, No Drawings

AZO DYES, PROCESSES FOR THEIR PREPARATION AND THE USE THEREOF

The present invention relates to novel azo dyes, to processes for their preparation and to the use thereof for dyeing and printing fibre materials, especially textile fibre materials.

The object on which the present invention is based was to find dyes which are suitable for dyeing nitrogen- and hydroxyl-containing fibre materials, especially cellulosic fibre materials, which have good fastness properties and which are stable to high temperatures.

It has now been found that the following azo dyes satisfy these requirements.

The present invention provides azo dyes of the formula (1)

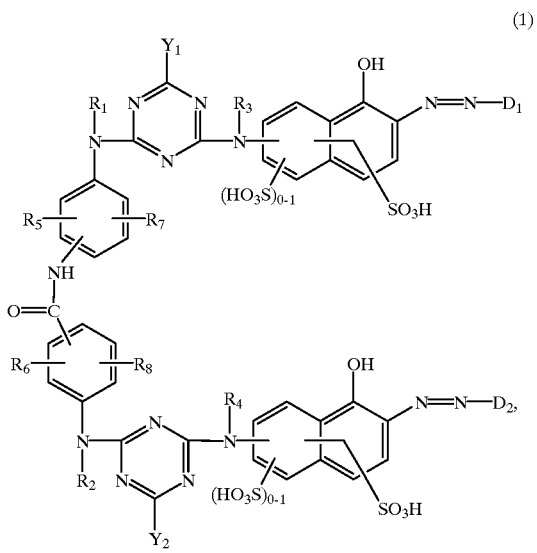

wherein $R_1$, $R_2$, $R_3$ and $R_4$ independently of one another are each hydrogen or substituted or unsubstituted $C_1$–$C_4$alkyl, $R_5$, $R_6$, $R_7$ and $R_8$ independently of one another are each hydrogen, $C_1$–$C_4$alkyl, $C_1$–$C_4$alkoxy, halogen or sulfo, $D_1$ and $D_2$ independently of one another are each a radical of the benzene or naphthalene series, and $Y_1$ and $Y_2$ independently of one another are each halogen, substituted or unsubstituted amino, morpholino or piperidin-1-yl or are piperazin-1-yl which is unsubstituted or substituted on the nitrogen, with the proviso that $D_1$ and $D_2$ are not both sulfophenyl if $Y_1$ and $Y_2$ are chlorine and $R_5$, $R_6$, $R_7$ and $R_8$ are hydrogen.

$C_1$–$C_4$Alkyl $R_1$, $R_2$, $R_3$ and $R_4$ independently of one another are for example methyl, ethyl, propyl, isopropyl, butyl, sec-butyl, tert-butyl or isobutyl. These alkyl radicals can be unsubstituted or substituted, for example, by hydroxyl, sulfo, sulfato, cyano or carboxyl. Preferred alkyl radicals are the corresponding unsubstituted radicals.

$C_1$–$C_4$Alkyl $R_5$, $R_6$, $R_7$ and $R_8$ independently of one another are for example methyl, ethyl, propyl, isopropyl, butyl, sec-butyl, tert-butyl or isobutyl, especially methyl or ethyl, preferably methyl.

$C_1$–$C_4$Alkoxy $R_5$, $R_6$, $R_7$ and $R_8$ independently of one another are for example methoxy, ethoxy, propoxy, isopropoxy, butoxy or isobutoxy, especially methoxy.

Halogen $R_5$, $R_6$, $R_7$ and $R_8$ independently of one another are for example fluorine, chlorine or bromine, especially chlorine.

The radicals $D_1$ and $D_2$ are unsubstituted or substituted.

Suitable substituents for the radicals $D_1$ or $D_2$ are substituents customary for azo dyes. Examples which may be mentioned are as follows: $C_1$–$C_4$alkyl, meaning methyl, ethyl, n- or isopropyl, n-, iso-, sec- or tert-butyl; $C_1$–$C_4$alkoxy, meaning methoxy, ethoxy, n- or isopropoxy or n-, iso-, sec- or tert-butoxy; these definitions also apply to the subsequent $C_1$–$C_4$alkyl and $C_1$–$C_4$alkoxy radicals; hydroxy-$C_1$–$C_4$alkoxy; phenoxy; $C_2$–$C_6$alkanoylamino which is unsubstituted or substituted in the alkyl moiety by hydroxyl or $C_1$–$C_4$alkoxy, such as acetylamino, hydroxyacetylamino, methoxyacetylamino or propionylamino; benzoylamino which is unsubstituted or substituted in the phenyl moiety by hydroxyl, sulfo, halogen, $C_1$–$C_4$alkyl or $C_1$–$C_4$alkoxy; $C_2$–$C_6$alkoxycarbonylamino which is unsubstituted or substituted in the alkyl moiety by hydroxyl, $C_1$–$C_4$alkyl or $C_1$–$C_4$alkoxy; phenoxycarbonylamino which is unsubstituted or substituted in the phenyl moiety by hydroxyl, $C_1$–$C_4$alkyl or $C_1$–$C_4$alkoxy; amino; N-$C_1$–$C_4$alkyl- or N,N-di-$C_1$–$C_4$alkylamino each of which is unsubstituted or substituted in the alkyl moiety by hydroxyl, $C_1$–$C_4$alkoxy, carboxyl, cyano, halogen, sulfo, sulfato, phenyl or sulfophenyl, such as methylamino, ethylamino, N,N-dimethylamino, N,N-diethylamino, β-cyanoethylamino, β-hydroxyethylamino, N,N-di-β-hydroxyethylamino, β-sulfoethylamino, γ-sulfo-n-propylamino, β-sulfatoethylamino, N-ethyl-N-(3-sulfobenzyl)amino, N-(β-sulfoethyl)-N-benzylamino; cyclohexylamino; N-phenylamino or N-$C_1$–$C_4$alkyl-N-phenylamino each of which is unsubstituted or substituted in the phenyl moiety by nitro, $C_1$–$C_4$alkyl, $C_1$–$C_4$alkoxy, carboxyl, halogen or sulfo; $C_2$–$C_4$alkoxycarbonyl, for example methoxy- or ethoxycarbonyl; trifluoromethyl; nitro; cyano; halogen, meaning generally, for example, fluorine, bromine or, in particular, chlorine; ureido; hydroxyl; carboxyl; sulfo; sulfomethyl; carbamoyl; carbamido; sulfamoyl; N-phenylsulfamoyl or N-$C_1$–$C_4$alkyl-N-phenylsulfamoyl each of which is unsubstituted or substituted in the phenyl moiety by sulfo or carboxyl; methyl- or ethylsulfonyl.

Other suitable substituents of the radicals $D_1$ or $D_2$ include fibre-reactive radicals.

Fibre-reactive radicals are, for example, an alkanoyl or alkylsulfonyl radical which is substituted by an eliminable atom or an eliminable group, an alkenoyl or alkenesulfonyl radical which is unsubstituted or substituted by an eliminable atom or an eliminable group, or a vinyl-containing alkenoyl or alkenesulfonyl radical. These alkanoyl, alkylsulfonyl and alkenesulfonyl radicals generally contain 2 to 8 carbon atoms and the alkenoyl radicals generally contain 3 to 8 carbon atoms. Mention may further be made of 4-, 5- or 6-membered carbocyclic or heterocyclic rings which are substituted by an eliminable atom or an eliminable group. Examples of suitable heterocyclic radicals are those which contain at least one eliminable substituent attached to a heterocyclic radical; inter alia, those which contain at least one reactive substituent attached to a 5- or 6-membered heterocyclic ring, such as to a monoazine, diazine, triazine, pyridine, pyrimidine, pyridazine, pyrazine, thiazine, oxazine or asymmetrical or symmetrical triazine ring, or to a ring system of that type which has one or more fused-on aromatic rings, such as a quinoline, phthalazine, quinazoline, quinoxaline, acridine, phenazine or phenanthridine ring system.

Examples of eliminable atoms or eliminable groups are, inter alia, halogen such as fluorine, chlorine or bromine, ammonium, including hydrazinium, sulfato, thiosulfato, phosphato, acetoxy, propionyloxy, azido, carboxypyridinium or thiocyanato.

The fibre-reactive radical and the dye radical may be connected to one another by a bridge. In addition to a direct bond or, for example, an amino group, there are a very wide variety of suitable bridge radicals. The bridge is, for example, an aliphatic, aromatic or heterocyclic radical; furthermore, the bridge may also be composed of various such radicals. The bridge generally comprises at least one functional group, such as the carbonyl group or the amino group, it being possible for the amino group to be substituted further by unsubstituted or halogen-, hydroxyl-, cyano-, $C_1$–$C_4$alkoxy-, $C_1$–$C_4$alkoxycarbonyl-, carboxyl-, sulfamoyl-, sulfo- or sulfato-substituted $C_1$–$C_4$alkyl. An example of a suitable aliphatic radical is an alkylene radical having 1 to 7 carbon atoms or its branched isomers. The carbon chain of the alkylene radical may be interrupted by a heteroatom, for example an oxygen atom. An example of an aromatic radical is a phenyl radical which may be substituted by $C_1$–$C_4$alkyl, such as methyl or ethyl, by $C_1$–$C_4$alkoxy, such as methoxy or ethoxy, by halogen, such as fluorine, bromine or especially chlorine, by carboxyl or by sulfo, and a suitable example of a heterocyclic radical is a piperazine radical.

Fibre-reactive radicals of this kind are known per se and are described in large numbers in, for example, Venkataraman "The Chemistry of Synthetic Dyes" Volume 6, pages 1–209, Academic Press, New York, London 1972 or in EP-A-625 549 and in U.S. Pat. No. 5,684,138.

Halogen $Y_1$ and $Y_2$ independently of one another are for example fluorine, chlorine or bromine, preferably fluorine or chlorine and especially chlorine.

Unsubstituted or substituted amino $Y_1$ and $Y_2$ independently of one another are for example amino; phenylamino or N-$C_1$–$C_4$alkyl-N-phenylamino each of which is unsubstituted or substituted in the phenyl ring by $C_1$–$C_4$alkyl, such as methyl, ethyl, n- or isopropyl, n-, iso-, sec- or tert-butyl, preferably methyl or ethyl, $C_1$–$C_4$alkoxy, such as methoxy, ethoxy, n- or isopropoxy or n-, iso-, sec- or tert-butoxy, preferably methoxy or ethoxy; hydroxyl, carboxyl, sulfo or halogen, such as fluorine, chlorine or bromine, preferably chlorine; N-mono- or N,N-di-$C_1$–$C_4$alkylamino each of which is unsubstituted or substituted in the alkyl moiety by $C_2$–$C_4$alkanoylamino, such as acetylamino, propionylamino or butyrylamino, preferably acetylamino, $C_1$–$C_4$alkoxy, such as methoxy, ethoxy, n- or isopropoxy or n-, iso-, sec- or tert-butoxy, preferably methoxy or ethoxy, hydroxyl, sulfo, sulfato or carboxyl, examples being N-methylamino, N-ethylamino, N-propylamino, N,N-dimethylamino or N,N-diethylamino, N-β-hydroxyethylamino and N,N-di-β-hydroxyethylamino; $C_5$–$C_7$cycloalkylamino which is unsubstituted or substituted in the cycloalkyl ring by $C_1$–$C_4$alkyl, such as methyl, ethyl, n- or isopropyl, n-, iso-, sec- or tert-butyl, preferably methyl, or are radicals of the formulae (2a), (2b) or (2c)

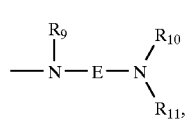
(2a)

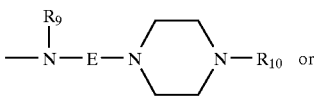
(2b)

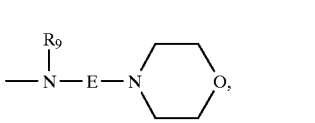
(2c)

in which $R_9$, $R_{10}$ and $R_{11}$ independently of one another are hydrogen or unsubstituted or substituted $C_1$–$C_8$alkyl, and E is a $C_2$–$C_8$alkylene which is unsubstituted or substituted and is uninterrupted or interrupted by one or more groups —O—, or is unsubstituted or substituted $C_5$–$C_7$cycloalkylene, $C_5$–$C_7$cycloalkylene-$C_1$–$C_8$alkylene or $C_1$–$C_8$alkylene-$C_5$–$C_7$cycloalkylene.

$C_1$–$C_8$Alkyl $R_9$, $R_{10}$ and $R_{11}$ independently of one another are for example methyl, ethyl, propyl, isopropyl, butyl, sec-butyl, tert-butyl, isobutyl or straight-chain or branched pentyl, hexyl, heptyl or octyl. As $C_1$–$C_8$alkyl the radicals $R_9$, $R_{10}$ and $R_{11}$ can be substituted further, for example, by hydroxyl, $C_1$–$C_4$alkoxy, halogen, amino or sulfato, especially by hydroxyl, $C_1$–$C_4$alkoxy or amino.

$R_9$, $R_{10}$ and $R_{11}$ independently of one another are preferably hydrogen or unsubstituted or hydroxyl-, $C_1$–$C_4$alkoxy- or amino-substituted $C_1$–$C_4$alkyl.

$R_9$, $R_{10}$ and $R_{11}$ independently of one another are with particular preference hydrogen or $C_1$–$C_4$alkyl, especially hydrogen, methyl or ethyl.

As $C_2$–$C_8$alkylene the radical E can be interrupted by one or more groups —O—, especially by from one to three and, preferably, by one or two groups —O—. Preference is given to the radicals which are not interrupted by a group —O—. Examples of possible substituents for the radical E as $C_2$–$C_8$alkylene are hydroxyl, $C_1$–$C_4$alkoxy, halogen, amino or sulfato, especially hydroxyl or $C_1$–$C_4$alkoxy. Examples of such $C_2$–$C_8$alkylene radicals are 1,2-ethylene, 1,2-propylene, 1,3-propylene and 2-hydroxy-substituted 1,3-propylene.

As $C_5$–$C_7$cycloalkylene, $C_5$–$C_7$cycloalkylene-$C_1$–$C_8$alkylene or $C_1$–$C_8$alkylene-$C_5$–$C_7$cycloalkylene the radical E can be substituted in the alkylene radical by, for example, hydroxyl or $C_1$–$C_4$alkoxy and in the cycloalkyl ring by, for example, $C_1$–$C_4$alkyl, especially methyl. By cycloalkyl is meant here especially cyclohexyl. The $C_5$–$C_7$cycloalkylene-$C_1$–$C_8$alkylene and $C_1$–$C_8$alkylene-$C_5$–$C_7$cycloalkylene are, in particular, suitably cyclohexylenemethylene and methylenecyclohexylene, which may be substituted in the cyclohexyl ring by $C_1$–$C_4$alkyl.

The radical E is preferably $C_2$–$C_8$alkylene, especially $C_2$–$C_4$alkylene, and is subject to the general and preferred definitions indicated above.

Unsubstituted or N-substituted piperazin-1-yl $Y_1$ and $Y_2$ are for example radicals of the formulae (2d) or (2e)

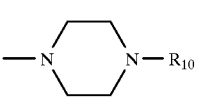
(2d)

-continued

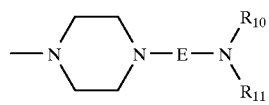
(2e)

in which

R₁₀, R₁₁ and E independently of one another have the general and preferred definitions indicated above.

R₁, R₂, R₃ and R₄ independently of one another are preferably each hydrogen or $C_1$–$C_4$alkyl, especially hydrogen.

R₅ and R₆ independently of one another are preferably each hydrogen or sulfo, especially hydrogen.

R₇ and R₈ are preferably hydrogen.

Preferred definitions of Y₁ and Y₂ independently of one another are in each case halogen, phenylamino, N-mono- or N,N-di-$C_1$–$C_4$alkylamino each of which is unsubstituted or substituted in the alkyl moiety by hydroxyl, or are morpholino or in each case a radical of the formula (2a'), (2c'), (2d') or (2e')

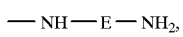
(2a')

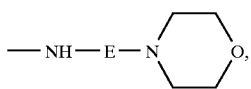
(2c')

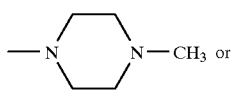
(2d')

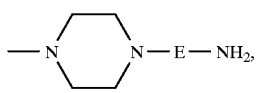
(2e')

in which

E is $C_2$–$C_4$alkylene.

With particular preference, Y₁ and Y₂ independently of one another are each halogen, phenylamino, N-β-hydroxylethylamino, N,N,-di-β-hydroxyethylamino, morpholino or in each case a radical of the formula (2a") or (2e")

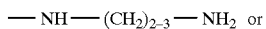
(2a")

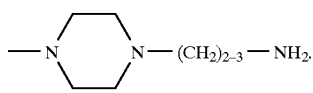
(2e")

With very particular preference, Y₁ and Y₂ independently of one another are halogen, especially chlorine.

The radicals Y₁ and Y₂ have preferably identical definitions.

The radicals D₁ and D₂ independently of one another are each a radical of the formula (3) or (4)

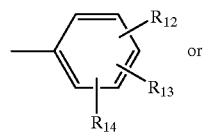
(3)

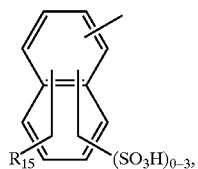
(4)

in which

R₁₂ and R₁₃ independently of one another are each hydrogen, halogen, $C_1$–$C_4$alkyl, $C_1$–$C_4$alkoxy, hydroxyl, carboxyl, carbamoyl, carbamido, ureido, amino, N-mono- or N,N-di-$C_1$–$C_4$alkylamino, phenylamino or N-$C_1$–$C_4$alkyl-N-phenylamino each of which is unsubstituted or substituted in the phenyl ring by nitro, $C_1$–$C_4$alkyl, $C_1$–$C_4$alkoxy or sulfo; $C_2$–$C_4$alkanoylamino which is unsubstituted or substituted in the alkyl moiety by $C_1$–$C_4$alkoxy or hydroxyl; benzoylamino which is unsubstituted or substituted in the phenyl ring by $C_1$–$C_4$alkyl, $C_1$–$C_4$alkoxy, sulfo or halogen; or are sulfo, preferably hydrogen, halogen, $C_1$–$C_4$alkyl, $C_1$–$C_4$alkoxy, hydroxyl, carboxyl, carbamoyl, carbamido, ureido, $C_2$–$C_4$alkanoylamino which is unsubstituted or substituted in the alkyl moiety by $C_1$–$C_4$alkoxy or hydroxyl; benzoylamino which is unsubstituted or substituted in the phenyl ring by $C_1$–$C_4$alkyl, $C_1$–$C_4$alkoxy, sulfo or halogen, or are sulfo, R₁₄ is hydrogen, $C_1$–$C_4$alkyl, $C_1$–$C_4$alkoxy, hydroxyl or a fibre-reactive radical, preferably hydrogen or a fibre-reactive radical, and R₁₅ is hydrogen, phenylamino or N-$C_1$–$C_4$alkyl-N-phenylamino each of which is unsubstituted or substituted in the phenyl ring by nitro, $C_1$–$C_4$alkyl, $C_1$–$C_4$alkoxy or sulfo; hydroxyl; nitro; or a fibre-reactive radical, preferably hydrogen; phenylamino which is unsubstituted or substituted in the phenyl ring by nitro, $C_1$–$C_4$alkyl, $C_1$–$C_4$alkoxy or sulfo; or is hydroxyl, nitro or a fibre-reactive radical.

Examples of suitable fibre-reactive radicals R₁₄ and R₁₅ independently of one another are the following radicals:

vinylsulfonyl, β-chloroethylsulfonyl, β-sulfatoethylsulfonyl, β-acetoxyethylsulfonyl, phosphatoethylsulfonyl, β-thiosulfatoethylsulfonyl, with the radicals given by way of example being attached directly or via a bridge, for example —NH—, —NCH₃—, —CONH—(CH₂)₂-rea, —CONH—(CH₂)₃-rea or —SO₂NH—(CH₂)₂-rea, to the phenyl or naphthyl radical. "rea" denotes the site of attachment of the radicals given by way of example.

Examples of further suitable fibre-reactive radicals R₁₄ and R₁₅ are, independently of one another, acryloyl, mono-, di- or trichloroacryloyl, such as —CO—CCl═CH₂, —CO—CH═CH—Cl, —CO—CCl═CH—CH₃; mono-, di- or tribromoacryloyl such as —CO—CBr═CH₂, —CO—CH=CH—Br, —CO—CBr=CH—CH$_3$; and also —CO—CCl=CH—COOH, —CO—CH=CCl—COOH, —CO—CBr=CH—COOH, —CO—CH=CBr—COOH, —CO—CCl=CCl—COOH, —CO—CBr=CBr—COOH; precursors of the acryloyl radical and of derivatives of the acryloyl radical, such as β-chloro- or β-bromopropionyl, 3-phenylsulfonylpropionyl, 3-methylsulfonylpropionyl, 2-chloro-3-phenylsulfonylpropionyl, 2,3-dichloropropionyl or 2,3-dibromopropionyl; and also 2-fluoro-2-chloro-3,3-difluorocyclobutane-1-carbonyl, 2,2,3,3-tetrafluorocyclobutane-1-carbonyl or 1-sulfonyl, β-(2,2,3,3-tetrafluoro-1-cyclobutyl)acryloyl, α- or β-alkenyl- or arylsulfonylacryloyl groups, such as α- or β-methylsulfonylacryloyl, chloroacetyl, bromoacetyl, 4-(β-chloroethylsulfonyl)butyryl, 4-vinylsulfonylbutyryl, 5-(β-chloroethylsulfonyl)caproyl, 6-vinylsulfonylcaproyl; and also 4fluoro-3-nitrobenzoyl, 4-fluoro-3-nitrophenylsulfonyl, 4-fluoro-3-methylsulfonylbenzoyl, 4-fluoro-3-cyanobenzoyl, 2-fluoro-5-methylsulfonylbenzoyl, with the radicals given by way of example being attached directly or via a bridge, for example —NH— or —NCH$_3$—, to the phenyl or naphthyl radical.

$R_{14}$ and $R_{15}$ as a fibre-reactive radical are preferably independently of one another each a radical of the formulae (5a), (5b), (5c) or (5d)

—SO$_2$Z     (5a),

—CONH—(CH$_2$)$_{2-3}$—SO$_2$Z     (5b),

—NH—CO—CH(Hal)—CH$_2$—Hal     (5c)

or

—NH—CO—C(Hal)=CH$_2$     (5d), in which

Z is a radical of the formula —CH$_2$CH$_2$—U or —CH=CH$_2$ and U is a leaving group, and Hal is halogen, especially chlorine or bromine.

Suitable leaving groups U are for example —Cl, —Br, —F, —OSO$_3$H, —SSO$_3$H, —OCO—CH$_3$, —OPO$_3$H$_2$, —OCO—CCl$_3$, —OCO—CHCl$_2$, —OCO—CH$_2$Cl, —OSO$_2$-C$_1$–C$_4$alkyl, —OSO$_2$—N(C$_1$–C$_4$alkyl)$_2$ or —OCO—C$_6$H$_5$.

U is preferably a group of the formula —Cl, —OSO$_3$H, —SSO$_3$H, —OCO—CH$_3$, —OCO—C$_6$H$_5$ or —OPO$_3$H$_2$, especially —OSO$_3$H.

In a preferred embodiment of the present invention the radicals D$_1$ and D$_2$ independently of one another are each a radical of the formulae (3) or (4) in which $R_{12}$ and $R_{13}$ independently of one another are each hydrogen, halogen, C$_1$–C$_4$alkyl, C$_1$–C$_4$alkoxy, carboxyl or sulfo and $R_{14}$ and $R_{15}$ independently of one another are each a fibre-reactive radical of the formulae (5a), (5b), (5c) or (5d), where Z, Hal and U are subject to the general and preferred definitions specified above.

In another preferred embodiment of the present invention D$_1$ is a radical of the formulae (3a) or (4a)

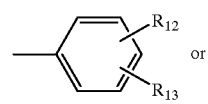

(3a)

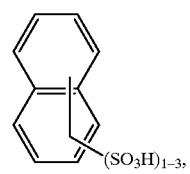

(4a)

$R_{12}$ and $R_{13}$ independently of one another are each hydrogen, C$_1$–C$_4$alkyl, C$_1$–C$_4$alkoxy, hydroxyl, carboxyl, carbamido, ureido, C$_2$–C$_4$alkanoylamino, benzoylamino which is unsubstituted or sulfo-substituted in the phenyl ring, or sulfo, preferably hydrogen, C$_1$–C$_4$alkyl, C$_1$–C$_4$alkoxy, carboxyl, C$_2$–C$_3$alkanoylamino or sulfo, and D$_2$ is a radical of the formulae (3b), (3c)

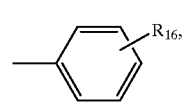

(3b)

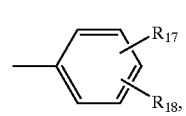

(3c) or (4a)

$R_{16}$ is hydrogen, C$_1$–C$_4$alkyl, C$_1$–C$_4$alkoxy, hydroxyl, carboxyl, carbamido, ureido, C$_2$–C$_4$alkanoylamino or benzoylamino which is unsubstituted or sulfo-substituted in the phenyl ring, preferably hydrogen, C$_1$–C$_4$alkyl, C$_1$–C$_4$alkoxy, carboxyl or C$_2$–C$_3$alkanoylamino, and $R_{17}$ and $R_{18}$ independently of one another are each C$_1$–C$_4$alkyl, C$_1$–C$_4$alkoxy, hydroxyl, carboxyl, carbamido, ureido, C$_2$–C$_4$alkanoylamino, benzoylamino which is unsubstituted or sulfo-substituted in the phenyl ring, or sulfo, preferably C$_1$–C$_4$alkyl, C$_1$–C$_4$alkoxy, carboxyl, C$_2$–C$_3$alkanoylamino or sulfo.

D$_1$ preferably has the definition of D$_2$.

In a particularly preferred embodiment of the present invention the dye of the formula (1) is a dye of the formula (6)

(6)

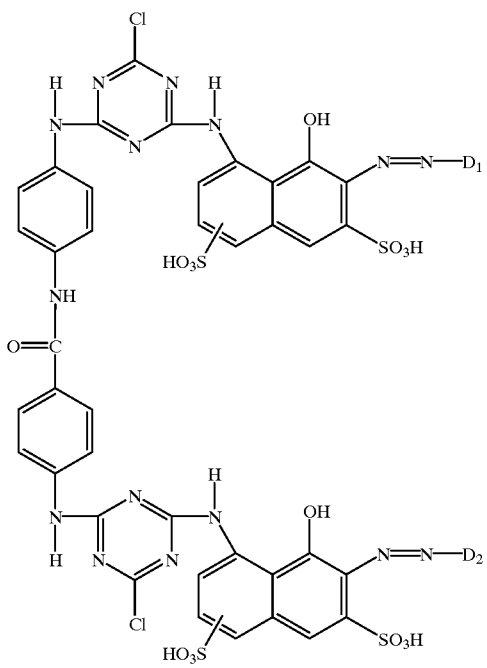

in which $D_1$ and $D_2$ independently of one another are each a radical of the formula (3d) or (4b)

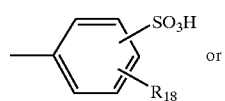

or

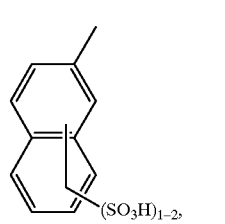

where $R_{18}$ is $C_1$–$C_4$alkyl, $C_1$–$C_4$alkoxy, $C_2$–$C_3$alkanoylamino or sulfo.

$D_1$ and $D_2$ in the compound of the formula (1) are preferably a radical of the formula (3d) in which $R_{18}$ is methyl, methoxy, acetylamino, propionylamino or sulfo.

The present invention additionally provides a process for preparing azo dyes of the formula (1), which comprises reacting approximately 1 mole equivalent of one compound each of the formulae (7a), (7b), (8a) and (8b)

  (7a)

  (7b)

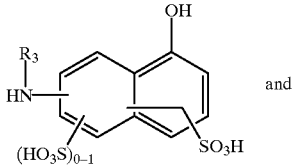  (8a)

and

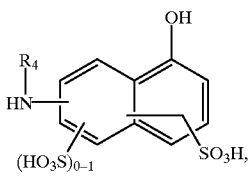  (8b)

approximately 2 mole equivalents of a compound of the formula (9)

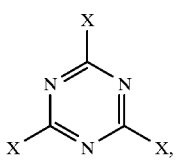  (9)

approximately 1 mole equivalent of a compound of the formula (10)

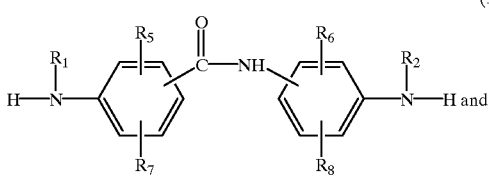  (10)

if desired approximately 1 mole equivalent of one compound each of the formulae (11) and (12)

$Y_1'$—H  (11)

and $Y_2'$—H  (12)

with one another in any desired sequence, where the radicals $R_1$, $R_2$, $R_3$, $R_4$, $R_5$, $R_6$, $R_7$, $R_8$, $D_1$ and $D_2$ independently of one another have the definitions indicated above under the formula (1), X is halogen and $Y_1'$ and $Y_2'$ independently of one another each has the definitions specified above for $Y_1$ and $Y_2$ under the formula (1) with the exception of halogen.

Since the individual process steps indicated above can be performed in different sequences, and in some cases may also be able to be performed simultaneously, a variety of process variants are possible. In general, the reaction is performed in succession in steps, with the sequence of the single reactions between the individual reaction components being guided advantageously by the particular conditions.

One process variant "A" for example comprises (i) diazotizing a compound of the formula (7a) and reacting the product with a compound of the formula (8a) to give the compound of the formula (13a)

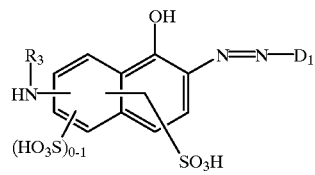

(13a)

and, independently thereof, diazotizing a compound of the formula (7b) and reacting the product with a compound of the formula (8b) to give the compound of the formula (13b)

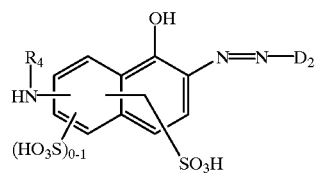

(13b)

(ii) reacting a compound of the formula (13a) with a halotriazine compound of the formula (9) to give the compound of the formula (14a)

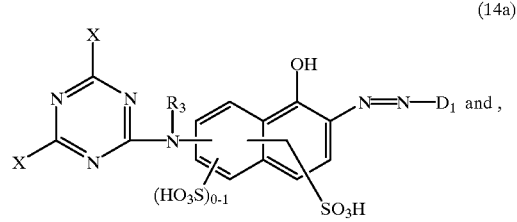

(14a)

independently thereof, reacting a compound of the formula (13b) with a halotriazine compound of the formula (9) to give the compound of the formula (14b)

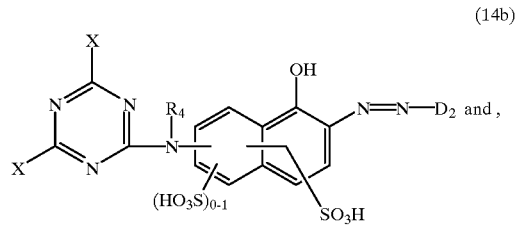

(14b)

(iii) reacting the compounds of the formulae (14a) and (14b) successively in any desired order with 1 mole equivalent of a compound of the formula (10):

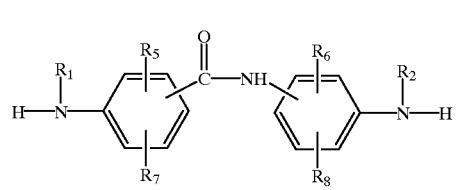

(10)

to give a compound of the formula (15)

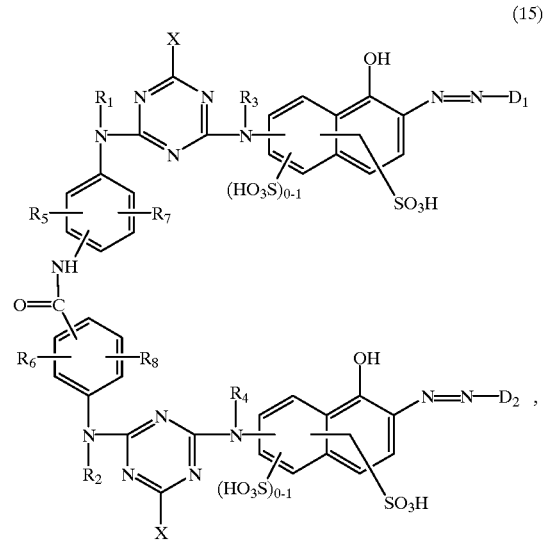

(15)

in which the radicals $R_1$, $R_2$, $R_3$, $R_4$, $R_5$, $R_6$, $R_7$, R8, $D_1$ and $D_2$ independently of one another have the definitions indicated above under the formula (1) and X is halogen, preferably chlorine.

An alternative process variant "B", for example, comprises (i) reacting compounds of the formulae (8a) and (8b) independently of one another with a compound of the formula (9) to give the compounds of the formulae (16a) and (16b)

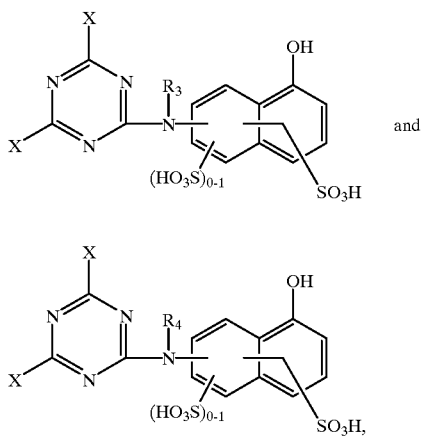

(ii) reacting a diazotized compound of the formula (7a) with a compound of the formula (16a) to give the compound of the formula (14a) and, independently thereof, reacting a diazotized compound of the formula (7b) with a compound of the formula (16b) to give a compound of the formula (14b), and (iii) proceeding as described under A(iii) by reacting the compounds of the formulae (14a) and (14b) successively in any desired sequence with 1 mole equivalent of a compound of the formula (10) to give a compound of the formula (15), in which the radicals $R_1$, $R_2$, $R_3$, $R_4$, $R_5$, $R_6$, $R_7$, $R_8$, $D_1$ and $D_2$ independently of one another have the definitions indicated above under the formula (1) and X is halogen, preferably chlorine.

A further process variant "C", for example, comprises (i) proceeding as indicated under B(i) by reacting compounds of the formulae (8a) and (8b) independently of one another with a compound of the formula (9) to give the compounds of the formulae (16a) and (16b).

(ii) reacting the compounds of the formulae (16a) and (16b) successively in any desired sequence with 1 mole equivalent of a compound of the formula (10) to give a compound of the formula (17)

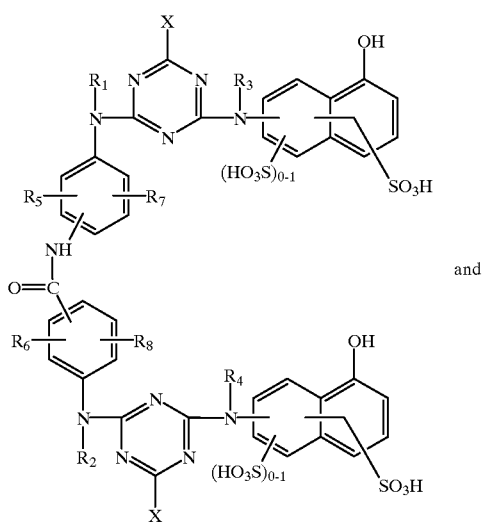

(iii) reacting the compound of the formula (17) with at least one of the diazotized compounds of the formulae (7a) and (7b) to give a compound of the formula (15), in which the radicals $R_1$, $R_2$, $R_3$, $R_4$, $R_5$, $R_6$, $R_7$, $R_8$, $D_1$ and $D_2$ independently of one another have the definitions indicated above under the formula (1) and X is halogen, preferably chlorine.

The compounds of the formulae (7a), (7b), (8a), (8b), (9) and (10) are known or can be prepared in analogy to known compounds.

The compounds of the formulae (7a) and (7b) are diazotized in accordance with A(i), B(ii) and C(iii) in a manner known per se, for example with a nitrite, such as with an alkali metal nitrite such as sodium nitrite, in a mineral acid medium, for example in a hydrochloric acid medium, at temperatures of, for example, from −5 to 40° C. and, preferably, from −5 to 10° C.

Coupling onto the coupling components of the formulae (8a) and (8b) in accordance with A(i), (16a) and (16b) in accordance with B(ii) and (17) in accordance with C(iii) takes place in a manner known per se at an acidic or neutral to weakly alkaline pH, for example at a pH of from 5 to 10, and at temperatures of, for example, from −5 to 40° C., preferably from 0 to 30° C.

The halotriazine compounds used are preferably cyanuric halides, such as cyanuric chloride or cyanuric fluoride, for example, especially cyanuric chloride.

The trihalotriazine compound of the formula (9) is preferably reacted first of all in accordance with the above-described process steps A(ii), B(i) and C(i) with approximately stoichiometric amounts of in each case one of the compounds of the formulae (8a), (8b), (13a) or (13b) at a temperature of from −5 to 20° C., preferably from 0 to 10° C., the pH being held neutral to acidic, preferably at from 2 to 7, in particular from 2 to 5, by adding appropriate bases, examples being alkali metal bases such as lithium, sodium or potassium hydroxide, carbonate or hydrogencarbonate. The reaction of the compound of the formula (10) with the compounds of the formulae (14a) and (14b) in accordance with A(iii) and B(iii) and with the compounds of the formulae (16a) and (16b) in accordance with C(ii) is preferably conducted at a slightly elevated temperature, advantageously for example at from 10 to 50° C., preferably from 30 to 50° C., and at a neutral to slightly acidic pH of, for example, from 5 to 7, judiciously employing approximately stoichiometric amounts of the compounds of the formulae (14a), (14b), (16a) and (16b). If the compounds of the formulae (14a) and (14b) are identical compounds and if the compounds of the formulae (16a) and (16b) are identical, then it is advantageous first of all to prepare 2 mole equivalents of the compound of the formula (14a) and to react them with approximately 1 mole equivalent of the compound of the formula (10) in accordance with A(iii) and B(iii), the temperature preferably being held first of all at from −5 to 20° C. and then being raised to about 30 to 60° C. It is likewise advantageous first of all to prepare 2 mole equivalents of the compound of the formula (16a) and to react them with approximately 1 mole equivalent of compound of the formula (10) in accordance with C(ii), advantageously using the procedure described above. The compounds of the formulae (15) and (17) obtainable in accordance with A(iii), B(iii), C(iii) and C(ii) still contain 2 halogen atoms X, which, if desired, can be converted to a group $Y_1$ or $Y_2$ respectively.

In order to introduce the radicals $Y_1$ and Y2 the halogen atoms X on the triazine radicals of the compounds of the formulae (15) and (17) are additionally reacted with at least one of the compounds of the formulae (11) and (12). The radicals $Y_1$ and $Y_2$ are generally introduced following a condensation reaction of the corresponding cyanuric halides at elevated temperature, preferably from 70 to 100° C., and at a neutral to slightly alkaline pH which, depending on the compound of the formula (11) or (12) employed is, for example, from 7 to 9.

The azo dyes according to the invention of the formula (1) are present either in the form of their free acid or, preferably, as salts thereof. Examples of suitable salts are the alkali metal, alkaline earth metal or ammonium salts or the salts of an organic amine. Examples which may be mentioned are the sodium, lithium, potassium or ammonium salts or the salt of mono-, di- or triethanolamine.

The definition sulfo generally comprises both the free acid form (—$SO_3H$) and the salt form.

The azo dyes according to the invention of the formula (1) comprise at least two sulfo groups, in particular from 2 to 10 sulfo groups and, preferably, from 4 to 8 sulfo groups.

The azo dyes of the formula (1) are anionic acid dyes. In these dyes the number of anionic groups, especially the number of sulfo groups, is greater than the number of cationic groups. By cationic groups are meant those which carry a cationic charge under the customary dyeing conditions. Examples are amino radicals attached to aliphatic structures. The nitrogen atoms present in the triazine ring and those attached to the triazine radical do not carry a cationic charge.

The present invention additionally provides for the use of azo dyes of the formula (1) and of azo dyes of the formula (1) obtained in accordance with the above-described preparation processes for dyeing or printing nitrogen- or hydroxyl-containing fibre materials.

The dyes of the invention are therefore suitable for dyeing or printing nitrogen- or hydroxyl-containing fibre materials. Examples which may be mentioned are silk, leather, wool, polyamide fibres and polyurethanes, and especially cellulosic fibre materials of all kinds. Examples of such cellulosic fibre materials are the natural cellulose fibres, such as cotton, linen and hemp, and also pulp, paper and regenerated cellulose. The dyes of the invention are also suitable for dyeing or printing hydroxyl-containing fibres which are present in blend fabrics, such as blends of cotton with polyester fibres or polyamide fibres. The dyes of the invention are particularly suitable for dyeing or printing cellulosic fibre materials. They can also be used for dyeing or printing natural or synthetic polyamide fibre materials.

The textile fibre materials can be in a very wide variety of processing states, for instance as fibre, yarn, wovens or knits.

The azo dyes according to the invention of the formula (1) give level dyeings and prints having good all-round fastness properties and, in particular, good wash, rub, wet, wet-rub, perspiration and light fastness. The azo dyes according to the invention of the formula (1) also feature uniform colour buildup, good affinity and high degrees of fixation. Where necessary the wet fastness properties, especially the wash fastness, of the resulting direct dyeings and prints can be improved substantially by aftertreatment with what are known as fixing agents.

It is likewise possible to dye textile fibre materials comprising mixed fibres, such as blends of wool/cotton, nylon/cotton, polyacrylic/cotton or, in particular, polyester/cotton fibres, by one-bath dyeing processes and in the presence of dyes for the other fibre types in each case, especially in the case of the direct-dyeing azo dyes of the formula (1).

The azo dyes according to the invention of the formula (1), especially the direct-dyeing azo dyes of the formula (1), lend themselves well to combination with other dyes, especially disperse dyes. The direct-dyeing azo dyes of the formula (1) have sufficient high-temperature stability and so can be used for dyeing under the dyeing conditions for polyester fibres, i.e. at temperatures in the range from about 100 to 150° C., preferably from 110 to 130° C., from an aqueous liquor and at a pH of from 4 to 7.5, preferably from 5 to 7.

It is therefore possible to employ customary disperse dyes together with the direct-dyeing azo dyes of the formula (1) in a single-stage, one-bath process for dyeing polyester/cotton mixed fibres (blend fabrics), the two types of fibre each being dyed by the respective dye in a uniform and colourfast way. Using a disperse dye in the same shade as the dyes according to the invention of the formula (1) makes it possible, in addition, to obtain solid dyeings.

The provision of the azo dyes according to the invention of the formula (1), especially the direct-dyeing azo dyes of the formula (1), allows substantial simplification of the dyeing of textile mixed fibres (blend fabrics), for example those comprising polyester fibres and cellulose fibres. The inherently common dye of each type of fibre of a fibre blend in a separate operation employing different dyeing conditions is thus no longer necessary.

The azo dyes according to the invention of the formula (1) are also suitable for producing aqueous inks for ink-jet printing.

The examples which follow serve to illustrate the invention. Parts and percentages are by weight unless stated otherwise. The relationship between parts by weight and parts by volume is the same as that between the kilogram and the liter. The temperatures are indicated in degrees Celsius.

EXAMPLE 1

36.6 parts of 4-propionylamidoorthanilic acid suspended in 250 parts of water are adjusted to a pH of 7 with 30% sodium hydroxide solution and diazotized with 44.95 parts of 4-normal sodium nitrite solution and 43.1 parts of 32% hydrochloric acid in 100 parts of an ice/water mixture at from 0 to 5° C. The excess nitrite is subsequently destroyed with sulfamic acid and the pH adjusted to 7 with sodium carbonate. The resulting solution of the diazo compound is added at from 5 to 10° C. to a solution of 48.0 parts of 1-amino-8-naphthol-3,6-disulfonic acid and 26.45 parts of 30% sodium hydroxide solution in 380 parts of an ice/water mixture, the pH during the coupling reaction being maintained at about 8 by further addition of 30% sodium hydroxide solution. Stirring is continued at 5–10° C. for 1 hour, the pH is adjusted to 6.5 with hydrochloric acid and the azo dye is precipitated by adding sodium chloride. The resulting dye, which corresponds to the compound of the formula (101)

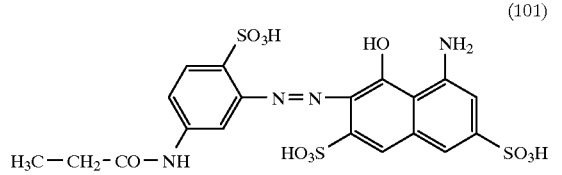

(101)

in the form of the free acid, is filtered off, washed with sodium chloride solution and dried.

EXAMPLE 2

Following the procedure of Example 1 but using not 36.6 parts of 4-propionylamidoorthanilic acid but instead 34.5 parts of 4-acetamidoorthanilic acid gives an azo dye which, in the form of the free acid, corresponds to the formula (102)

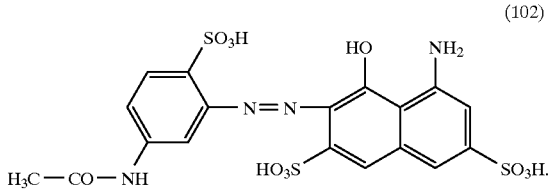

(102)

4-Propionylamidoorthanilic acid and 4-acetamidoorthanilic acid are prepared from 1,3-phenylenediamine-3-sulfonic acid by conventional methods.

EXAMPLE 3

18.5 parts of cyanuric chloride are stirred up with 100 parts of ice-water and 100 parts of ice. The resulting suspension of cyanuric chloride is charged to a vessel and a solution of 57.4 parts of the compound of the formula (101) from Example 1 in 1150 parts of water is added dropwise at a temperature of from 8 to 10° C. and at a pH of 5. The pH is held at a level of 5 by adding a 2-normal aqueous potassium hydrogencarbonate solution. Following the end of the dropwise addition, the mixture obtained is allowed to react for about 2.5 hours. The amount of 2-normal aqueous potassium hydrogencarbonate solution consumed is approximately 100 parts. A reaction solution is obtained which comprises the compound, indicated in the form of the free acid, of the formula (103)

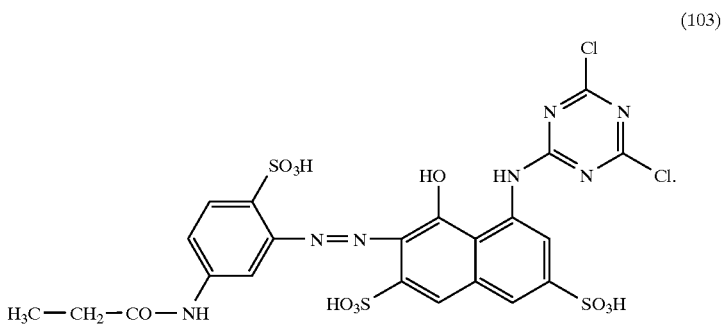

(103)

In a second stage, 17.0 parts of 4,4'-diaminobenzanilide are dissolved in 100 parts of 2-normal hydrochloric acid and this solution is added dropwise at 35° C. to the solution of the compound of the formula (103) obtained as indicated above, the pH being maintained at a level of from 5 to 6.5 by adding 2-normal aqueous potassium hydrogencarbonate solution. Following the end of dropwise addition, the reaction mixture is heated to from 60 to 70° C. and then left to react overnight at room temperature. The amount of 2-normal aqueous potassium hydrogencarbonate solution consumed is approximately 200 parts. The product is subsequently salted out with sodium chloride and the precipitate is filtered off with suction. Drying in a vacuum cabinet gives 83.1 parts of a compound (crude product) which, in the form of the free acid, corresponds to the formula (104)

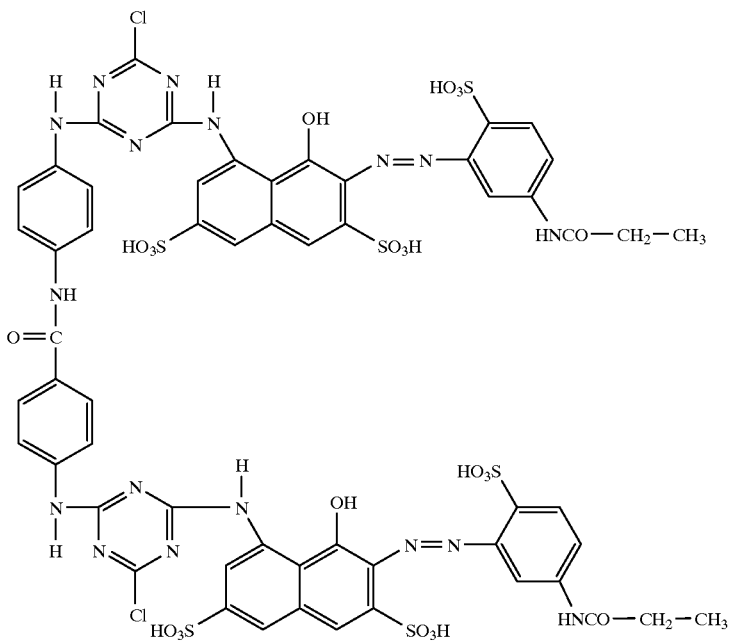

(104)

and dyes cotton in pink shades

EXAMPLE 4

30.1 parts of the compound of the formula (104) are dissolved in 500 parts of water, 2.75 parts of 2-aminoethanol are added and the mixture is heated to a temperature of 85° C. The pH falls from an initial 11.2 to a value of 8.5. The reaction period is about 20 hours. The reaction product is separated off by salting it out with sodium chloride and filtering off the precipitated product. Drying gives 28.5 parts of a dye which, in the form of the free acid, corresponds to the compound of the formula (105)

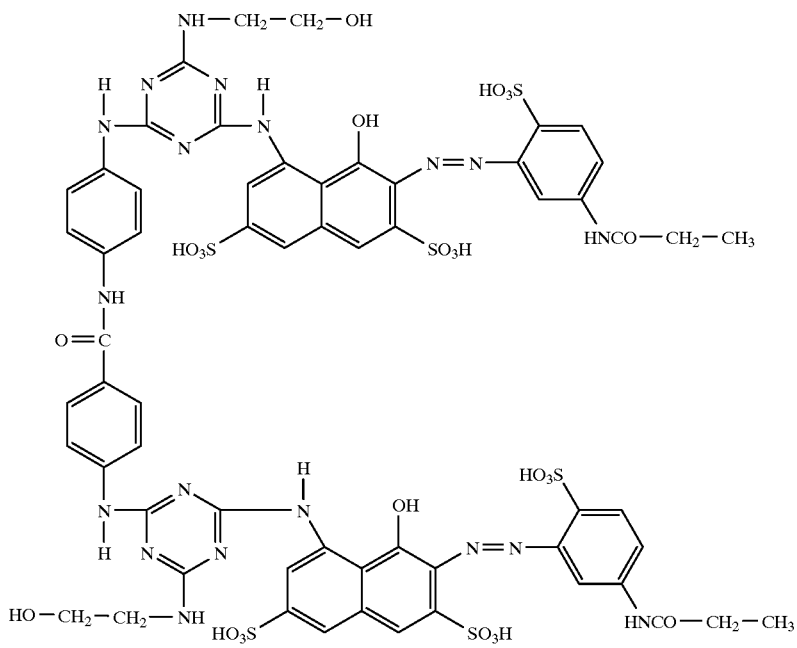

(105)

and dyes cotton in pink shades.

EXAMPLES 5 TO 27

Following the procedure indicated in Example 3 and, if appropriate, Example 4 but using not 57.4 parts of the compound of the formula (101) but instead an equimolar amount of a compound of the formula (106)

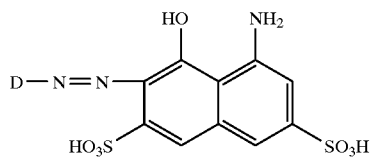
(106)

and, if appropriate, 2.75 parts of 2-aminoethanol, or not 2.75 parts of 2-aminoethanol but instead an equimolar amount of a compound of the formula (107)

H—Y' (107)

where D and H—Y' have the definitions indicated in Table 1 below gives the dyes of the general formula (108)

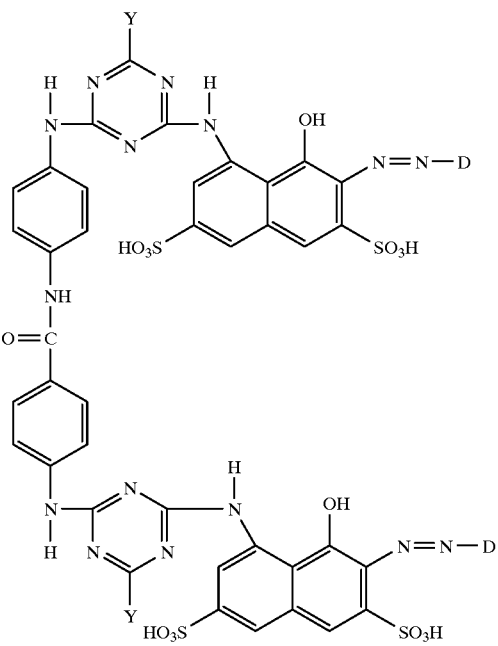
(108)

indicated in Table 1, D and Y having the definitions indicated in Table 1, and which dye cotton in pink shades.

TABLE 1

| Ex. | D | H—Y' | Y |
|---|---|---|---|
| 5 | HO$_3$S— C$_6$H$_3$(SO$_3$H)— | — | Cl |
| 6 | HO$_3$S— C$_6$H$_3$(SO$_3$H)— | H$_2$N—CH$_2$CH$_2$OH | —NH—CH$_2$CH$_2$OH |
| 7 | HO$_3$S— C$_6$H$_3$(SO$_3$H)— | HN(CH$_2$CH$_2$OH)$_2$ | —N(CH$_2$CH$_2$OH)$_2$ |
| 8 | HO$_3$S— C$_6$H$_3$(CH$_3$)— | — | Cl |
| 9 | HO$_3$S— C$_6$H$_3$(CH$_3$)— | H$_2$N—CH$_2$CH$_2$OH | —NH—CH$_2$CH$_2$OH |

TABLE 1-continued

| Ex. | D | H—Y' | Y |
|---|---|---|---|
| 10 | 2-methyl-5-methylbenzenesulfonic acid (SO₃H, CH₃, CH₃) | — | Cl |
| 11 | 2-methyl-4-methoxybenzene with HO₃S | — | Cl |
| 12 | 2-methyl-4-methoxybenzene with HO₃S | H₂N—CH₂CH₂OH | —NH—CH₂CH₂OH |
| 13 | 2-methyl-4-methoxybenzene with HO₃S | H—N(morpholine) | —N(morpholine) |
| 14 | 2-methyl-4-methoxybenzene with HO₃S | H₂N—C₆H₅ | —NH—C₆H₅ |
| 15 | 4-methoxy-3-methylbenzenesulfonic acid | — | Cl |
| 16 | 4-methoxy-3-methylbenzenesulfonic acid | H—N(morpholine) | —N(morpholine) |
| 17 | 4-methylbenzoic acid | — | Cl |
| 18 | 3-methyl-4-sulfo-acetanilide (HO₃S, HNCOCH₃) | — | Cl |

TABLE 1-continued

| Ex. | D | H—Y' | Y |
|---|---|---|---|
| 19 | 4-HO₃S, 3-CH₃, 6-HNCOCH₂CH₃ phenyl | H—N(piperazine)N—(CH₂)₂—NH₂ | —N(piperazine)N—(CH₂)₂—NH₂ |
| 20 | 4-HO₃S, 3-CH₃, 6-HNCOCH₂CH₃ phenyl | H₂N—CH₂CH₂—NH₂ | —NH—CH₂CH₂—NH₂ |
| 21 | 4-CONH₂, 3-CH₃ phenyl | — | Cl |
| 22 | 4-CONH₂, 3-CH₃ phenyl | H—N(CH₃)—(CH₂)₂—OH | —N(CH₃)—(CH₂)₂—OH |
| 23 | 2-CH₃, 1-HO₃S, 5-SO₃H naphthyl | — | Cl |
| 24 | 2-CH₃, 1-HO₃S, 5-SO₃H naphthyl | H—N(piperazine)N—(CH₂)₂—NH₂ | —N(piperazine)N—(CH₂)₂—NH₂ |
| 25 | 2-CH₃, 1-HO₃S naphthyl | — | Cl |
| 26 | 2-CH₃, 1-HO₃S naphthyl | H—N(piperazine)N—(CH₂)₂—NH₂ | —N(piperazine)N—(CH₂)₂—NH₂ |

TABLE 1-continued

| Ex. | D | H—Y' | Y |
|---|---|---|---|
| 27 | 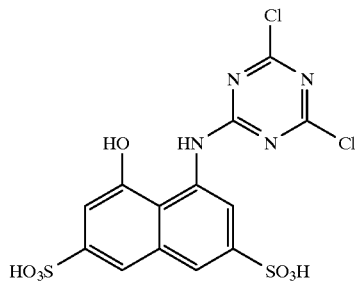 | H₂N—CH₂CH₂—NH₂ | —NH—CH₂CH₂—NH₂ |

The compounds of the formula (106) are known, insofar as their preparation has not already been described in Examples 1 and 2, or can be prepared in analogy to known compounds or in analogy to Examples 1 and 2.

EXAMPLE 28

18.5 parts of cyanuric chloride are stirred up with 100 parts of ice-water and 100 parts of ice. The resulting suspension of cyanuric chloride is charged to a vessel and a solution of 31.9 parts of 1-amino-8-naphthol-3,6-disulfonic acid in 200 parts of aqueous sodium hydroxide solution (pH 6) is added dropwise at a temperature of from 0 to 2° C. and a pH of 2. The pH is maintained at a level of 2 by adding 2-normal aqueous sodium hydroxide solution. Following the end of the dropwise addition, the resulting mixture is allowed to react for about 2.5 hours. The amount of 2-normal aqueous sodium hydroxide solution consumed is approximately 52 parts. A reaction solution is obtained which comprises the compound, indicated in the form of the free acid, of the formula (109)

(109)

In a second stage, 11.4 parts of 4,4'-diaminobenzanilide are dissolved in 150 parts of dilute hydrochloric acid and added dropwise at 10° C. to the solution of the compound of the formula (109) obtained as indicated above, the pH being maintained at a level of from 2 to 2.5 by adding 2-normal aqueous sodium hydroxide solution. Following the end of the dropwise addition, the reaction mixture is adjusted to a pH of 5 and allowed to react overnight at room temperature. It is subsequently heated to 70° C. and the pH is adjusted to 7.8. The amount of 2-normal aqueous sodium hydroxide solution consumed is approximately 100 parts. After 5 minutes, the pH is adjusted to 6.5 with aqueous hydrochloric acid and the reaction mixture is cooled to 18° C. The precipitated product is filtered off with suction. Drying in a vacuum cabinet gives 59 parts of a compound which, in the form of the free acid, corresponds to the formula (110)

(110)

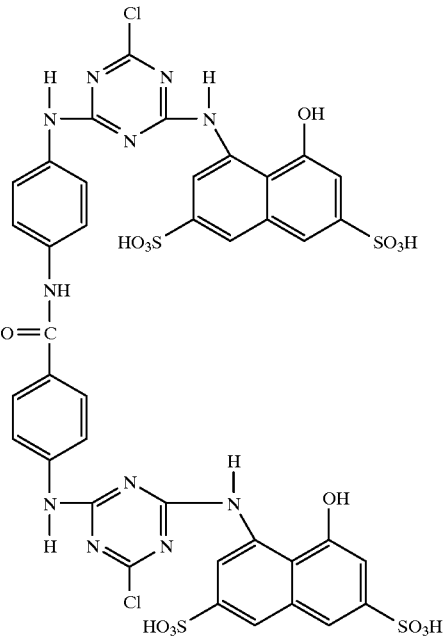

36.1 parts of 2-amino-5-(β-sulfatoethylsulfonyl) benzenesulfonic acid are stirred up in 100 parts of ice/water mixture and 26 parts of concentrated hydrochloric acid. A solution of 7.04 parts of sodium nitrite in 25 parts of water is subsequently added dropwise over the course of 30 minutes at a temperature of about 0° C. Following diazotization, the excess nitrite is destroyed with sulfamic acid. For the coupling, 54.6 parts of a compound of the formula (110) are dissolved in 400 parts of water, and about 14.5 parts of 30% aqueous sodium hydroxide solution are added. The suspension of the diazo compound, obtainable as indicated above, is added dropwise to this solution and the pH is maintained at a level of 4.8 by adding aqueous sodium hydroxide solution. After the coupling is over, the product is salted out with sodium chloride and filtered off. Drying gives 90 parts of a compound which, in the form of the free acid, corresponds to the formula (111 )

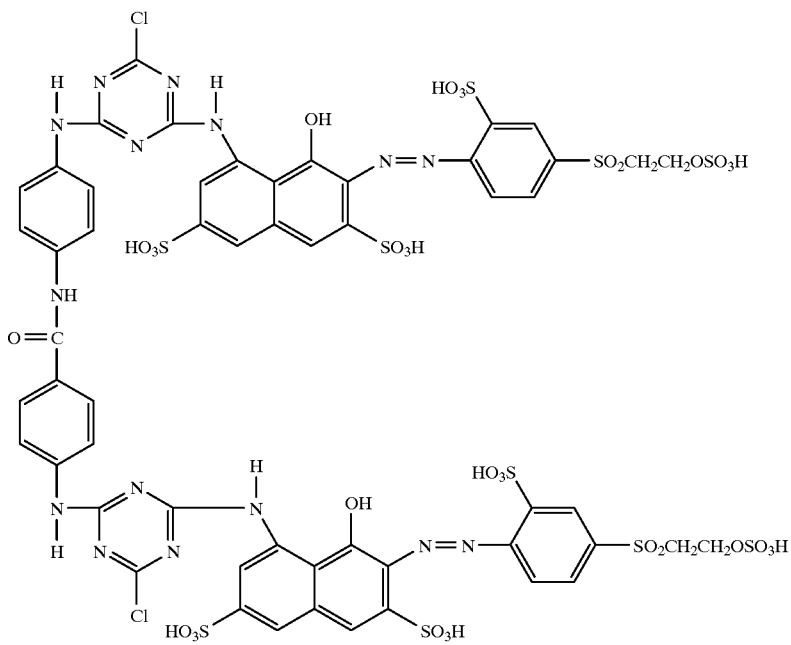

(111)

and which dyes cotton in pink shades.

EXAMPLE 29

Following the procedure indicated in Example 28 but using not 36.1 parts of 2-amino-5-(β-sulfatoethylsulfonyl) benzenesulfonic acid but instead an equimolar amount of 2-amino-4-(2,3-dibromopropionylamido)benzenesulfonic acid gives a compound which, in the form of the free acid, corresponds to the formula (112)

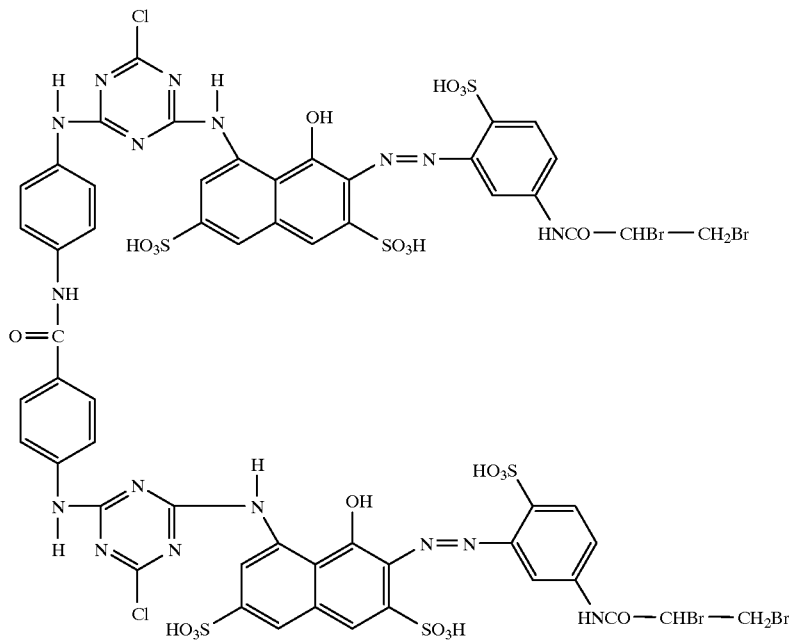

(112)

and which dyes cotton in pink shades.

EXAMPLE 30

Following the procedure indicated in Example 28 but using not 36.1 parts of 2-amino-5-(β-sulfatoethylsulfonyl) benzenesulfonic acid but instead an equimolar amount of 2-amino-6-(β-sulfatoethylsulfonyl)naphthalenesulfonic acid gives a compound which, in the form of the free acid, corresponds to the formula (113)

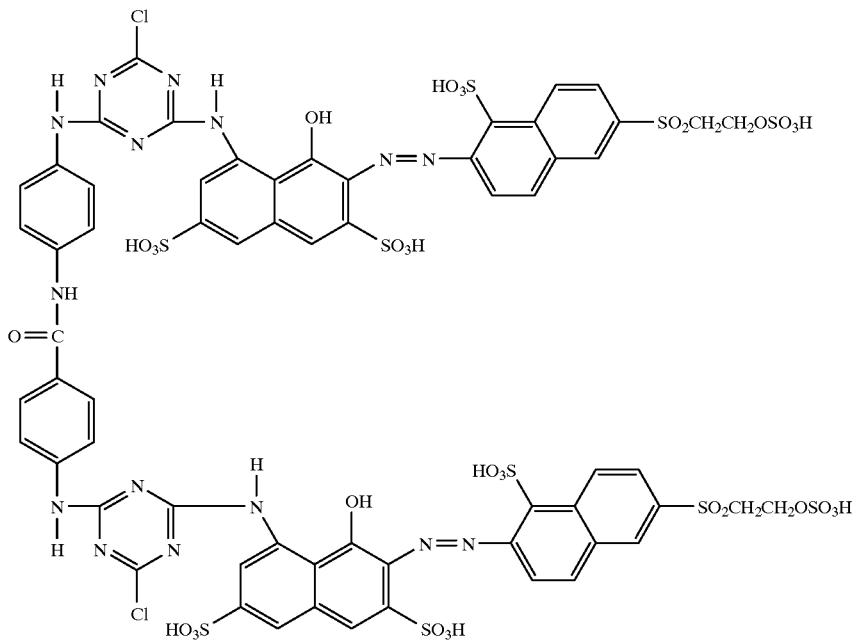

(113)

and which dyes cotton in pink shades.

EXAMPLE 31

Following the procedure indicated in Example 28 but using not 36.1 parts of 2-amino-5-(β-sulfatoethylsulfonyl)benzenesulfonic acid but instead an equimolar amount of the compound of the formula

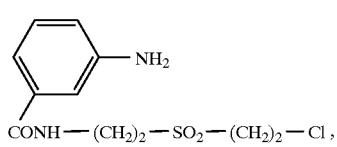

(114)

gives a compound which, in the form of the free acid, corresponds to the formula (115)

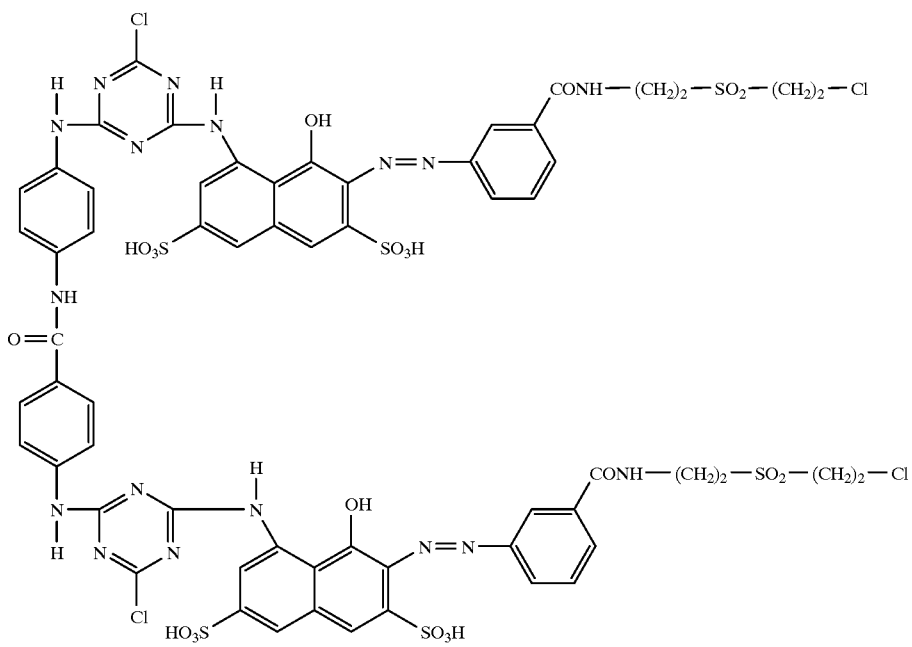

(115)

and which dyes cotton in pink shades.

The diazo components used in Examples 28 to 34 and the compound of the formula (114) are known or can be prepared in analogy to known compounds.

Dye instructions 1

10 parts of cotton fabric (bleached and mercerized) are introduced at about 30° C. into a dyebath containing 200 parts of water and 0.35 part of the dye of Example 3. The liquor is heated to 95° C. over the course of 30 minutes and is left at this temperature for 15 minutes. Then 4 parts of sodium sulfate are added and dyeing is continued at 95° C. for 45 minutes. The dyebath is then cooled to 80° C. over the course of 15 minutes and is left at this temperature for 15 minutes more. The dyeing is then rinsed thoroughly with cold water and dried.

Dye instructions 2

10 parts of a fibre blend of polyester and cotton are introduced at about 50° C. into a dyebath containing 200 parts of water, a dye mixture consisting of 0.35 part of C.I. Disperse Red 60 and 0.35 part of the dye of Example 4, 0.4 part of ammonium sulfate and 0.2 part of an anionic dispersant (e.g. formaldehyde condensation product of naphthalenesulfonic acid). The dyebath is adjusted with formic acid to a pH of 5.5, 1 part of sodium sulfate is added, and the bath is then heated to about 130° C. over the course of 45 minutes. Dyeing is continued at 130° C. for 45 minutes, then the dyebath is cooled to about 80° C. over the course of 30 minutes and is left at this temperature for a further 45 minutes. The dye is then rinsed thoroughly with cold water and dried.

Dye instructions 3

The procedure of dyeing instructions 1 or 2 is followed except that, after the end of the dyeing procedure, the cold-rinsed dyeing is placed in a fresh bath which is at a temperature of about 30° C. and contains 200 parts of water and 0.2–0.6 part of a cationic aftertreatment agent (amine-formaldehyde-dicyandiamide condensation product or preparation based on dicyandiamide and diethylenetriamine). The dyeing is aftertreated at 30° C. for 30 minutes and then dried without a further rinsing process; a dyeing having improved wet fastness properties is obtained.

Dyeing instructions 4

The procedure of dyeing instructions 1 or 2 is followed except that, after the end of the dyeing process, the cold-rinsed dyeing is placed in a fresh bath which is at a temperature of about 25° C. and contains 200 parts of water, 1 part of sodium sulfate and 0.6 part of a fibre-reactive cationic aftertreatment agent based on N-methyldialkylamine and epichlorohydrin. The temperature is raised to 40° C. over the course of 15 minutes, 0.8 part of 30% sodium hydroxide solution is added, and the dyeing is treated at 40° C. for a further 45 minutes. The dyeing is finally hot-rinsed and dried; it features improved wet fastness properties.

Dyeing instructions 5

2 parts of the reactive dye obtained in Example 28 are dissolved in 400 parts of water; 1500 parts are added of a solution containing 53 g of sodium chloride per liter. This dyebath is entered at 40° C. with 100 parts of cotton fabric. After 45 minutes, 100 parts of a solution containing 16 g of sodium hydroxide and 20 g of calcined sodium carbonate per liter are added. The temperature of the dyebath is held at 40° C. for a further 45 minutes. The dyed goods are then rinsed, soaped at the boil for a quarter of an hour with a nonionic detergent, then rinsed again and dried.

Printing instructions 3 parts of the reactive dye obtained in Example 28 are scattered with rapid stirring into 100 parts of a stock thickener comprising 50 parts of 5% sodium alginate thickener, 27.8 parts of water, 20 parts of urea, 1 part of sodium m-nitrobenzenesulfonate and 1.2 parts of sodium hydrogencarbonate. The resulting printing paste is used to print a cotton fabric, and the printed material obtained is dried and steamed at 102° C. for 2 minutes in saturated steam. The printed fabric is then rinsed, soaped at the boil if appropriate and then rinsed again and subsequently dried.

What is claimed is:

1. An azo dye of the formula (1)

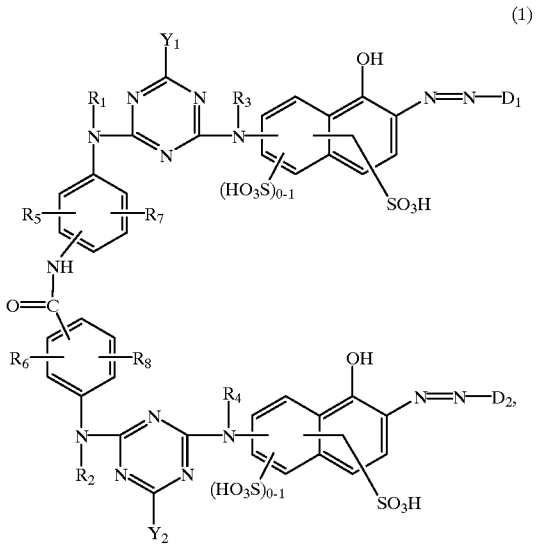

wherein $R_1$, $R_2$, $R_3$ and $R_4$ independently of one another are each hydrogen or substituted or unsubstituted $C_1$–$C_4$alkyl, $R_5$, $R_6$, $R_7$ and $R_8$ independently of one another are each hydrogen, $C_1$–$C_4$alkyl, $C_1$–$C_4$alkoxy, halogen or sulfo, $D_1$ and $D_2$ independently of one another are each a radical of the benzene or naphthalene series, and $Y_1$ and $Y_2$ independently of one another are halogen, with the proviso that $D_1$ and $D_2$ are not both sulfophenyl if $Y_1$ and $Y_2$ are chlorine and $R_5$, $R_6$, $R_7$ and $R_8$ are hydrogen.

2. An azo dye according to claim 1, wherein $R_1$, $R_2$, $R_3$ and $R_4$ independently of one another are each hydrogen or $C_1$–$C_4$alkyl.

3. An azo dye according to claim 1, wherein $R_5$ and $R_6$ independently of one another are each hydrogen or sulfo, and $R_7$ and $R_8$ are hydrogen.

4. An azo dye according to claim 1, wherein $D_1$ and $D_2$ independently of one another are each a radical of the formula (3) or (4)

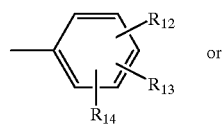

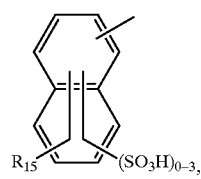

in which $R_{12}$ and $R_{13}$ independently of one another are each hydrogen, halogen, $C_1$–$C_4$alkyl, $C_1$–$C_4$alkoxy, hydroxyl, carboxyl, carbamoyl, carbamido, ureido, amino, N-mono- or N,N-di-$C_1$–$C_4$alkylamino, phenylamino or N-$C_1$–$C_4$alkyl-N-phenylamino each of which is unsubstituted or substituted in the phenyl ring by nitro, $C_1$–$C_4$alkyl, $C_1$–$C_4$alkoxy or sulfo;

$C_2$–$C_4$alkanoylamino which is unsubstituted or substituted in the alkyl moiety by $C_1$–$C_4$alkoxy or hydroxyl; benzoylamino which is unsubstituted or substituted in the phenyl ring by $C_1$–$C_4$alkyl, $C_1$–$C_4$alkoxy, sulfo or halogen; or are sulfo, $R_{14}$ is hydrogen, $C_1$–$C_4$alkoxy, hydroxyl or a fibre-reactive radical, and $R_{15}$ is hydrogen; phenylamino or N-$C_1$–$C_4$alkyl-N-phenylamino each of which is unsubstituted or substituted in the phenyl ring by nitro, $C_1$–$C_4$alkyl, $C_1$–$C_4$alkoxy or sulfo; or is hydroxyl, nitro or a fibre-reactive radical.

5. An azo dye according to claim 4, wherein $R_{12}$ and $R_{13}$ independently of one another are hydrogen, halogen, $C_1$–$C_4$alkyl, $C_1$–$C_4$alkoxy, hydroxyl, carboxyl, carbamoyl, carbamido, ureido, $C_2$–$C_4$alkanoylamino which is unsubstituted or substituted in the alkyl moiety by $C_1$–$C_4$alkoxy or hydroxyl, or are benzoylamino which is unsubstituted or substituted in the phenyl ring by $C_1$–$C_4$alkyl, $C_1$–$C_4$alkoxy, sulfo or halogen, or are sulfo, $R_{14}$ is hydrogen or a fibre-reactive radical, and $R_{15}$ is hydrogen; phenylamino which is unsubstituted or substituted in the phenyl ring by nitro, $C_1$–$C_4$alkyl, $C_1$–$C_4$alkoxy or sulfo; or is hydroxyl, nitro or a fibre-reactive radical.

6. An azo dye according to claim 4, wherein $R_{14}$ and $R_{15}$ as fibre-reactive radical independently of one another are each a radical of the formula (5a), (5b), (5c) or (5d)

—SO₂Z  (5a),
—CONH—(CH₂)₂₋₃—SO₂Z  (5b),
—NH—CO—CH(Hal)—CH₂—Hal  (5c)

or

—NH—CO—G(Hal)=CH₂  (5d), in which
Z is a radical of the formula —CH₂CH₂—U or —CH=CH₂ and U is a leaving group, and Hal is halogen.

7. An azo dye according to claim 6, wherein
U is a radical —O—SO₃H and
Hal is chlorine or bromine.

8. An azo dye according to claim 1, wherein
D₁ is a radical of the formula (3a) or (4a)

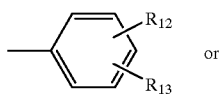  (3a)

or

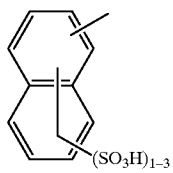  (4a)

in which
R₁₂ and R₁₃ independently of one another are each hydrogen, C₁–C₄alkyl, C₁–C₄alkoxy, hydroxyl, carboxyl, carbamido, ureido, C₂–C₄alkanoylamino, benzoylamino which is unsubstituted or sulfo-substituted in the phenyl ring, or sulfo, and
D₂ is a radical of the formulae (3b), (3c)

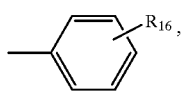  (3b)

(3c) or (4a)

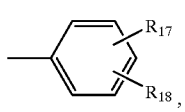

in which
R₁₆ is hydrogen, C₁–C₄alkyl, C₁–C₄alkoxy, hydroxyl, carboxyl, carbamido, ureido, C₂–C₄alkanoylamino or benzoylamino which is unsubstituted or sulfo-substituted in the phenyl ring, and
R₁₇ and R₁₈ independently of one another are each C₁–C₄alkyl, C₁–C₄alkoxy, hydroxyl, carboxyl, carbamido, ureido, C₂–C₄alkanoylamino, benzoylamino which is unsubstituted or sulfo-substituted in the phenyl ring, or sulfo.

9. An azo dye according to claim 8, wherein
R₁₂ and R₁₃ independently of one another are each hydrogen, C₁–C₄alkyl, C₁–C₄alkoxy, carboxyl, C₂–C₃alkanoylamino or sulfo, R₁₆ is hydrogen, C₁–C₄alkyl, C₁–C₄alkoxy, carboxyl or C₂–C₃alkanoylamino, and
R₁₇ and R₁₈ independently of one another are each C₁–C₄alkyl, C₁–C₄alkoxy, carboxyl, C₂–C₃alkanoylamino or sulfo.

10. An azo dye according to claim 1, wherein the dye of the formula (1) is a dye of the formula (6)

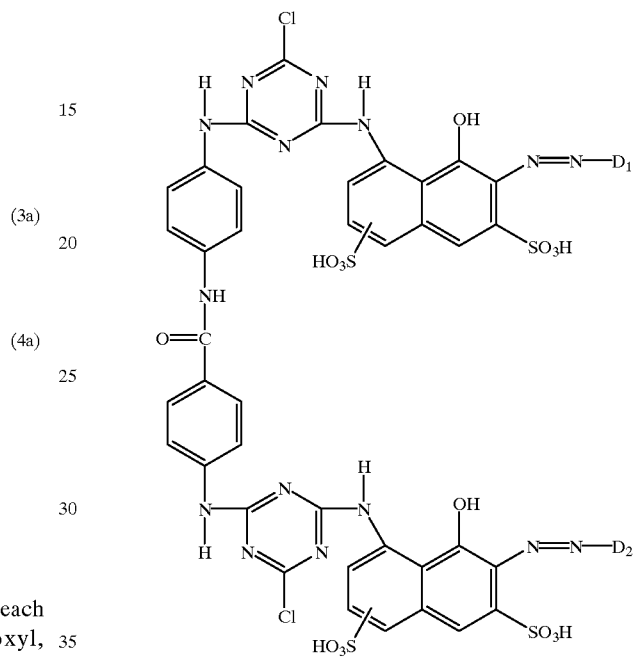  (6)

in which
D₁ and D₂ independently of one another are each a radical of the formula (3d) or (4b)

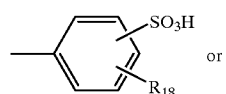  (3d)

or

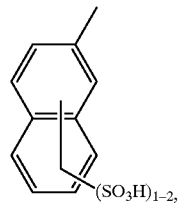  (4b)

in which
R₁₈ is C₁–C₄alkyl, C₁–C₄alkoxy, C₂–C₃alkanoylamino or sulfo.

11. An azo dye according to claim 10, wherein
D₁ and D₂ are a radical of the formula (3d) in which
R₁₈ is methyl, methoxy, C₂–C₃alkanoylamino or sulfo.

12. An azo dye according to claim 2, wherein R₁, R₂, R₃ and R₄ are each hydrogen.

13. A process for dyeing or printing fibre material containing nitrogen- or hydroxyl groups, which process comprises the step of applying to this fibre material a tinctorial amount of an azo dye according to claim 1.

14. A process according to claim 13, wherein said fibre material is cellulosic fibre material.

* * * * *